March 29, 1966     A. R. EASTMAN     3,242,595
ORRERY OR PLANETARIUM
Filed Oct. 24, 1963     3 Sheets-Sheet 1
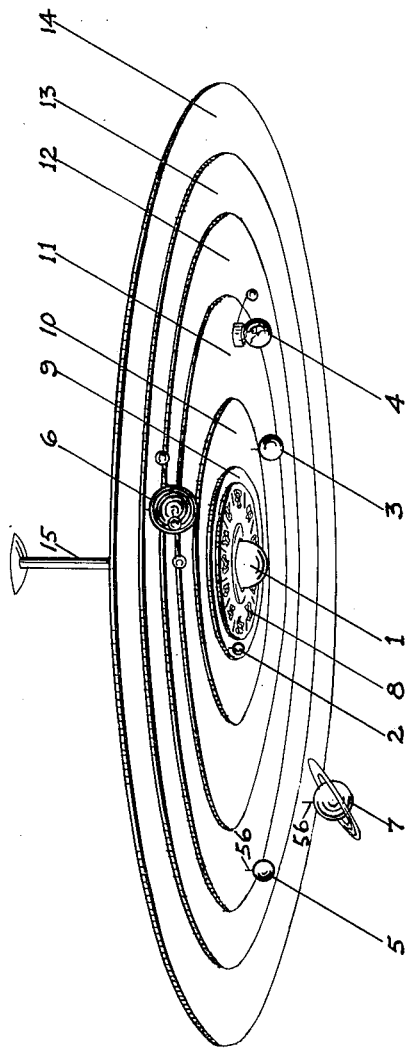
FIG.1
Inventor
A. Reyner Eastman
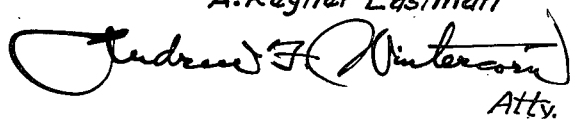
Atty.

March 29, 1966     A. R. EASTMAN     3,242,595
ORRERY OR PLANETARIUM
Filed Oct. 24, 1963     3 Sheets-Sheet 2
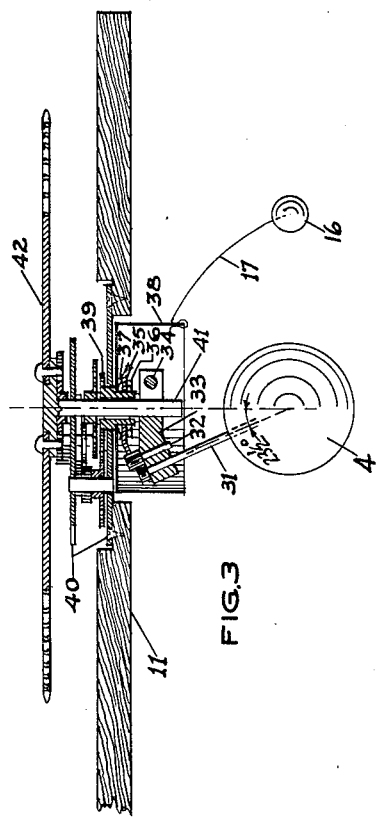
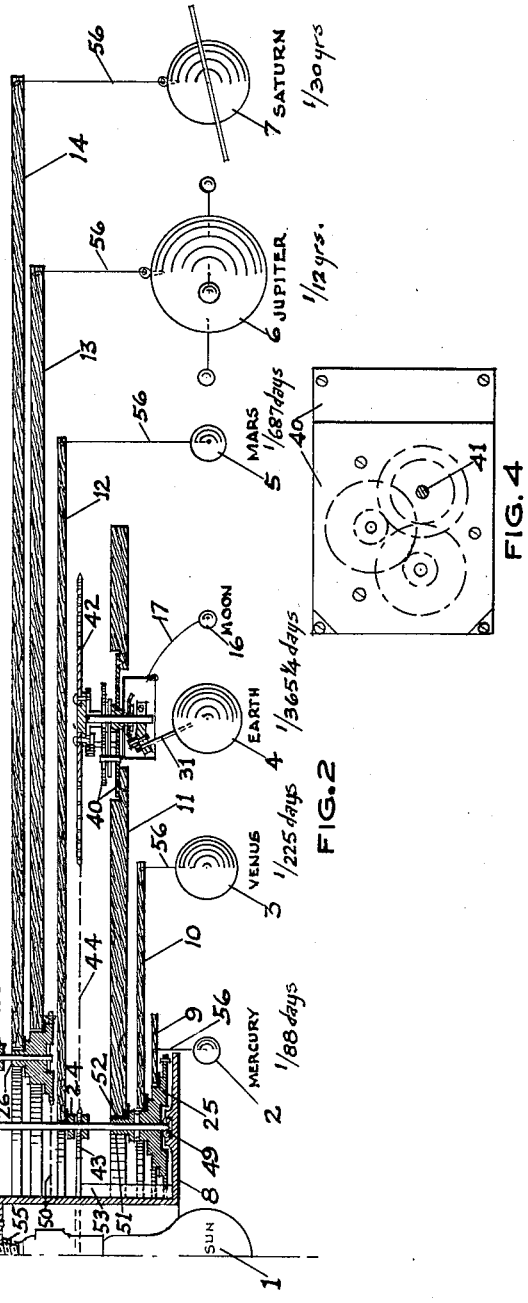
Inventor
A. Reyner Eastman
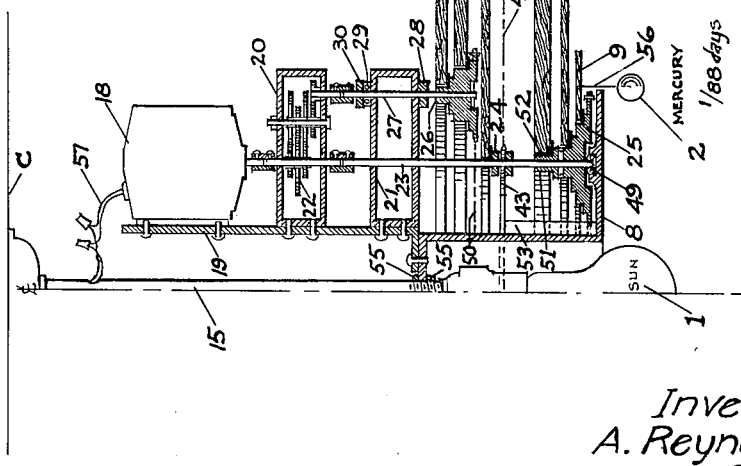
Atty.

March 29, 1966  A. R. EASTMAN  3,242,595
ORRERY OR PLANETARIUM
Filed Oct. 24, 1963  3 Sheets-Sheet 3
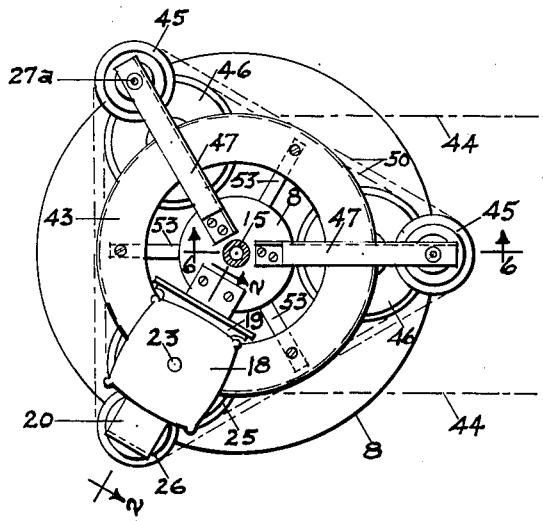
FIG. 5
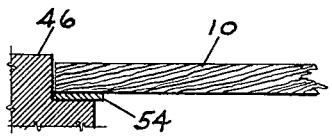
FIG. 8
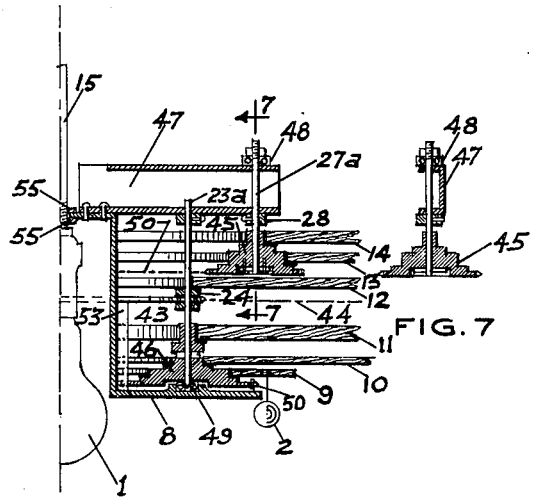
FIG. 6
FIG. 7
Inventor
A. Reyner Eastman
Atty.

United States Patent Office 3,242,595
Patented Mar. 29, 1966

3,242,595
ORRERY OR PLANETARIUM
A. Reyner Eastman, 2406 Clinton Road, Rockford, Ill.
Filed Oct. 24, 1963, Ser. No. 318,624
4 Claims. (Cl. 35—45)

My invention relates to an orrery or planetarium and has for its principal object the provision of a simpler and more economical actuating mechanism, and one which besides presenting a clean, aesthetic appearance, can be mounted readily on a stock fixture stud of an electric ceiling outlet.

A further object is to provide such a mechanism in which all the naked eye features of the solar system are clearly shown moving about the sun at approximately the correct relative speeds and in the correct size relationship, featuring the rotation of the Earth about a fixed attitude polar axis with its revolving moon. Planets may be manually moved into their correct positions in the zodiac opposite the twelve signs at the center as revealed by various almanacs for the particular date of demonstration, and the Earth's moon can be correctly positioned before starting the motor, and as space probes are fired from the Earth, it can be seen where in the future the planets will be when the probes arrive at their destinations.

It should therefore be understood from the above that this orrery was not conceived principally to reproduce in every minute detail all the objects in the solar system with all their various satellites and motions thereof, but to combine only the essential objects and their motions into an artistic assembly, embellished with the signs of the zodiac, months of the year, and sidereal times at midnight indicated for their viewing as the earth sweeps its orbit. Thus, it is apparent that about all the phenomena of the solar system and the outer space constellations of the zodiac can be demonstrated, making it a highly educational and aesthetic fixture for the home, library, schools, airports, and public buildings.

The accompanying drawings illustrate my invention, showing the unique and economical mechanics for obtaining the foregoing results by driving the stepped cones which both support and drive the overlapping canopy disks that in turn support all of the planets, rotate the earth on a fixed attitude axis, and revolve the moon about the Earth. In these drawings, FIG. 1 is a perspective view of my improved orrery;

FIG. 2 is a half cross-section of the assembled drive portion on a larger scale, taken on line 2—2 of FIG. 5;

FIG. 3 is an enlargement of a portion of FIG. 2 showing a cross-section of the Earth and moon system;

FIG. 4 is a plan view of the gear arrangement shown in FIG. 3;

FIG. 5 is a top view of the driving and support assembly;

FIG. 6 is a half cross-section of the idler support stepped cones, taken on line 6—6 of FIG. 5;

FIG. 7 is a section of the channel support of one of the two idler stepped cones, taken on line 7—7 of FIG. 6, and FIG. 8 is a cross-section of a typical planet supporting disk with bearing ring attached thereto and resting on a typical stepped cone.

The same reference numerals are applied to corresponding parts in these eight figures.

Referring to the drawings, the planets are shown approximately in their proper relationship to the Earth and sun; the sun being represented by a centrally located electric light bulb numbered 1, Mercury 2, Venus, the Earth 4, Mars 5, Jupiter 6, and Saturn 7, all in one plane. The shade structure, on the bottom of which the zodiac and time dials are readable from below the orrery, is indicated at 8, and this, besides leaving just enough of the light exposed, to represent the sun at 1, serves as a support for the rest of the orrery or planetarium, besides carrying on its bottom the signs of the zodiac, months of the year, and sidereal times, so that the disks 9–14 can be adjusted, before starting the motor, to suit the particular date of a demonstration, in accordance with an almanac. Support of the planets, in accordance with my invention, is provided by these separately rotatably adjustable, frictionally driven disks 9–14 of different diameters coaxially arranged in stacked relationship and arranged to be driven at different speed ratios, the smallest and fastest one 9 for Mercury 2, the next larger and slower one 10 above that for Venus 3, a still larger and still slower one 11 above that for the Earth 4, a larger and much slower one 12 above that for Mars 5, and another larger and far slower one 13 above that for Jupiter 6, and the largest and slowest one 14 above that for Saturn 7. These disks simulate the sky and are carried on the shade structure 8 mounted on a stock threaded electric light fixture stem 15 which is suspended from an outlet box in the ceiling, indicated at C in FIG. 2, and carries the sun light bulb 1 in a socket on its lower end. The Earth's moon is shown at 16 carried on a radial wire support 17 and arranged to orbit about the Earth. The electric drive motor 18 has suitably built-in reduction gearing and is carried on a bracket 19 rigid with respect to the shade structure 8, and this bracket also supports a secondary reduction gear box 20 and shaft support bracket 21. Box 20 contains secondary reduction gearing 22 through which the output shaft of motor 18 transmits drive to shaft 27 at the desired low speed relative to primary drive shaft 23. The disks 9 to 14, as stated before, are all driven frictionally for simplicity and economy and ease of setting. Thus, a bearing collar 24 driven by shaft 23 is associated with and drives Mars disk 12 at a slow speed relative to disks 9–11. A stepped drive cone 25 is driven by shaft 23 and associated with Mercury disk 9, Venus disk 10, and Earth disk 11, disk 9 turning fastest of the three because it rests on the low ermost and largest radius step of the cone 25, while disk 10 turns somewhat slower, being on an intermediate smaller radius step, and disk 11 turns still slower, being on the smallest radius step at the top of the cone. Another stepped drive cone 26 turns at a much slower speed than cone 25, this cone 26 being driven by shaft 27 from motor 18 through reduction gearing 22 and being associated with the slowest turning disks 13 and 14 for Jupiter and Saturn, respectively. The secondary drive shaft 27 extends downwardly from gear box 20 through bearings on bracket 21 to transmit drive to the stepped cone 26. At 28 is indicated a thrust collar below bracket 21 on shaft 27, and 29 is a ball thrust bearing above bracket 21 under a thrust collar 30 on shaft 27 to support the large diameter disks 13 and 14 while drive is transmitted thereto.

In FIG. 3, the Earth 4 is shown supported for rotation on an inclined axis shaft 31 carrying a gear on its upper end meshing with a gear on a parallel shaft 32, these two shafts being rotatably mounted in a bracket 33, the radially slotted end of which is clamped as indicated at 34 to the fixed attitude Earth drive shaft 41, to permit adjusting the bracket 33 relative to shaft 41 after installation of the present unit, to point the shaft 31 north to agree with the direction of inclination of the Earth's axis. Drive gear 35, meshing with the gear on shaft 32 is supported on and secured by nut 36 on drive sleeve 39, which is the independent Earth and moon drive means. A circular washer 37 rides on top of gear 35 and surrounds shaft 41 between the gear and the top wall of an inverted open bottom cylindrical visual shield 38, onto the lower edge of which the moon support 17 is attached as shown, keeping the moon always at the same radius relative to the Earth throughout its orbit around the Earth. Plates 40, suitably fixed in parallel spaced relation to one another by spacers form a gear box mounted on top of the Earth's disk 11 for the reduction gear train between gear 35 and shaft 41. Drive is transmitted to the shaft 41 in the turning of disk 11 by virtue of shaft 41 being rotatably mounted on the disk 11 and carrying sprocket 42 which in turn is connected with a fixed sprocket 43 by means of a chain 44. Sprockets 42 and 43 are of the same diameter, and sprocket 43 is disposed in fixed concentric relation to fixture stem 15.

As seen in FIG. 5, there are two idler stepped cones 45 spaced 120° apart and spaced 120° with respect to the drive stepped cone 26 for tripod support and friction drive of disks 13 and 14 for Jupiter and Saturn, respectively. Also, in like manner, there are two idler stepped cones 46 spaced 120° apart and with respect to stepped drive cone 25, giving tripod support and friction drive for disks 9, 10 and 11 for Mercury, Venus and Earth, respectively. Channel brackets 47 extend radially from the circular upper end of the shade structure 8 and provide supports at their outer ends for the spindles carrying the idler cones 45, as seen in FIGS. 5, 6 and 7. Ball thrust bearings are indicated at 48 and 49 for the vertical shafts 27a and 23a, respectively, carrying the idler stepped cones 45 and 46, respectively, and chain drives are indicated at 50 in FIGS. 5 and 6, for transmitting drive to the idler cones 45 and 46 from the driven cones 26 and 25, respectively. A knurled face 51 is provided on the top step of the stepped drive cone 25 to transmit friction drive more or less positively to the Earth's disk 11 through a circular neoprene liner 52 provided on the inner radius of disk 11 at the center hole. Radial arms 53, welded or otherwise suitably secured to the outside of the shade structure 8 serve to support the fixed sprocket 43. Less positive friction drives are provided for disks 9, 10, 11, 12, 13 and 14, each of these, as seen in FIG. 8, resting on the cones and having a bearing ring 54 of durable friction material secured to their under side. The shade structure 8 derives all of its support from the stem 15 by means of collars 55 threadedly adjustable on the stem against the opposite sides of the horizontal wall on the upper end of this structure to clamp the shade structure firmly.

In operation, the shade structure encloses the light bulb 1 leaving only the lower portion thereof exposed, as best seen in FIGS. 1 and 2, to represent the sun, about which the planets, numbered 2 to 7, all orbit in a substantially common horizontal plane, each of the planets 2, 3, 5, 6 and 7 being suspended on a wire, as indicated at 56, attached to its associaed disks 9, 10, 12, 13 and 14, respectively. The Earth 4 with its moon 16 is supported on its disk 11 but in a different way, as best seen in FIG. 3. The disks 9 to 14 together simulate a sky and give the present structure a nice appearance, making it suitable for use in an appropriate room in any fine home, as well as in all the other places where orrerys or planetariums may be used. The planets orbit around the sun 1 at the correct relative distances to one another except Jupiter 6 and Saturn 7, and the diameters of all of the planets and the moon may be in the correct relationship except Jupiter 6 and Saturn 7, the latter two planets' distances and sizes being made to appear reasonably correct only, although their orbital period about the sun is substantially correct in relation to the other planets. The stepped cones 25, 46, 46, besides providing three-point support for each of the disks 9, 10 and 11, give the approximate drive ratio necessary for each. Thus, since Mercury 2 orbits the sun 1 once every 88 days, it is on disk 9 on the lowermost large radius step of the cone 25, whereas Venus 3, which orbits the sun once every 225 days is on disk 10 on the next smaller radius step, and the Earth 4, which orbits the sun once every 365¼ days, is on disk 11 on the uppermost and smallest radius step. The disk 12 for Mars 5, which orbits the sun once in every 687 days, rests on the small radius drive collar 24 on shaft 23, corresponding in radius approximately to the top of cone 25. Jupiter 6 orbits the sun only once per twelve years and is on disk 13 resting on the larger radius lower portion of cone 26, the shaft 27 of which is disposed farther from stem 15 than shaft 23 and is furthermore driven at a greatly reduced speed in relation to shaft 23 for cone 25, by means of the reduction gearing 22 in gear box 20, whereby to obtain through the slower speed drive on a larger radius the desired slow speed drive. Saturn 7 orbits the sun only once in thirty years and is therefore on disk 14 resting on the small radius upper portion of cone 26 to turn sufficiently slower than disk 13.

The fixture stem 15 must have two sets of wires with separate switches for the control of the two circuits, one switch controlling the turning on and off of the light bulb 1 and the other controlling the drive motor 18. Separate wires extending from stem 15 to motor 18 are indicated at 57 in FIG. 2. The tripod support provided for each of the disks 9 to 14 insures each disk operating in its proper plane at all times, and the individual disks can be turned with respect to the others to restore the proper phase relationship in the event it is ever disturbed and to enable starting from any desired phase, instead of having to go through the entire cycle, when that is desired. Obviously, as the Earth's disk 11 turns, the fixed sprocket 43 through its chain connection 44 with the same diameter sprocket 42 keeps the shaft 41 from turning in relation to the stem 15 and maintains a fixed attitude of the Earth's axis 31. However, the orbiting of the Earth's moon 16 and the rotation of the Earth's axis shaft 31 are derived by the turning of sprocket 42 and shaft 41 in relation to the disk 11, and this movement is used to drive the gear train whose gear box 40 is attached to the disk 11. As indicated in FIG. 3, the Earth's axis shaft 31 is inclined at 23½° from the vertical and is held firmly on a fixed relationship to a shaft 41 by the tightening of the clamp screw 34 to tighten the slotted end of bracket 33 on shaft 41. By loosening this screw 34 the attitude of the Earth's axis 31 can be turned to point north after the present unit is hung on the fixture stem 15.

It is believed the foregoing description conveys a good understanding of the objects and advantages of my invention. The appended claims have been drawn to cover all legitimate modifications and adaptations.

I claim:

1. In a planatarium or the like, a central light source representative of the sun, a support carrying a plurality of concentric centrally apertured disks of graduated diameters, the smallest lowermost and the largest uppermost, all rotatable on said support relative to the central light source, these disks together simulating a sky with the central light source as the sun, spherical planets supported on these disks for orbiting relative to the sun and relative to one another at their approximate radial distance relationship from the sun and all in approximately the same plane below the disks, an electric motor, and drive means driven thereby and transmitting drive to said disks at different speed ratios for approximating the relative orbital movement of the various planets about the sun, the last named means comprising a stepped drive cone and two stepped idler cones rotatably mounted at a predetermined radius relative to said support on axes normal to said disks in 120° circumferentially spaced coplanar relation for support of a plurality of said superposed disks, the disks each resting on coplanar steps on said cones to provide three-point support for each disk and friction drive at different speed ratios for said disks while permitting rotary adjustment of the individual disks relative to one another, the drive cone being driven by said motor.

2. A structure as set forth in claim 1 wherein each of said cones is carried on a shaft turning with the cones, the structure including a drive collar of small diameter in relation to the drive cone and turning with it on the same shaft, and two idler collars of small diameter in relation to the idler cones mounted on their respective shafts to turn with said idler cones in coplanar relation with the first mentioned collar, the cones and collar serving to support a plurality of said super imposed disks, some of which rest on coplanar steps on said cones which provide three-point support and friction drive for said disks at different speed ratios according to the radius of the steps, another of said disks resting on said collars to provide three-point support and friction drive therefor at a speed ratio different from that of the other disks, all of said disks being rotatably adjustable relative to one another on said cones and collars, the shaft carrying the driven cone and collar being driven by said motor.

3. A structure as set forth in claim 1 wherein each of said cones is carried on a shaft turning with the cones, the structure including a drive collar of small diameter in relation to the drive cone and turning with it on the same shaft, and two idler collars of small diameter in relation to the idler cones mounted on their respective shafts to turn with said idler cones in coplanar relation with the first mentioned collar, the cones and collars serving to support a plurality of said superimposed disks, some of which rest on coplanar steps on said cones which provide three-point support and friction drive for said disks at different speed ratios according to the radius of the steps, another of said disks resting on said collars to provide three-point support and friction drive therefor at a speed ratio different from that of the other disks, all of said disks being rotatably adjustable relative to one another on said cones and collars, the shaft carrying the driven cone and collar being driven by said motor, the last named means also comprising another stepped drive cone disposed on a larger radius than the first drive cone with respect to the first mentioned support and two stepped idler cones on the same radius as the last named cone, these three cones being rotatably mounted on axes normal to said disks at 120° circumferentially spaced coplanar relation for support of another plurality of said superposed disks, the latter disks each resting on coplanar steps on said cones to provide three-point support and friction drive for said disks at different drive ratios depending upon the radius of the steps for the individual disks relative to one another, the last mentioned drive cone being driven by said motor at reduced speed in relation to the first mentioned drive cone.

4. A structure as set forth in claim 1 wherein the last named means also comprises another stepped drive cone disposed on a larger radius than the first drive cone with respect to the first mentioned support and two stepped idler cones on the same radius as the last named cone, these three cones being rotatably mounted on axes normal to said disks in 120° circumferentially spaced coplanar relation for support of another plurality of said superposed disks, the latter disks each resting on coplanar steps on said cones to provide three-point support and friction drive for said disks at different drive ratios depending upon the radius of the steps for the individual disks relative to one another, the last mentioned drive cone being driven by said motor at reduced speed in relation to the first mentioned drive cone.

References Cited by the Examiner

UNITED STATES PATENTS

| | | | |
|---|---|---|---|
| 1,838,942 | 12/1931 | Heid | 35—45 |
| 2,114,082 | 4/1938 | Mast | 35—45 |
| 2,226,032 | 12/1940 | Wahlberg | 35—45 |
| 2,418,718 | 4/1947 | Maginley | 35—45 |
| 2,797,500 | 7/1957 | Fisk | 35—45 |

EUGENE R. CAPOZIO, *Primary Examiner.*

JEROME SCHNALL, *Examiner.*

H. S. SKOGQUIST, *Assistant Examiner.*